M. L. OSOFS & M. R. SLUTZKY.
HYDROCYCLE.
APPLICATION FILED JULY 22, 1912.
1,060,620.
Patented May 6, 1913.
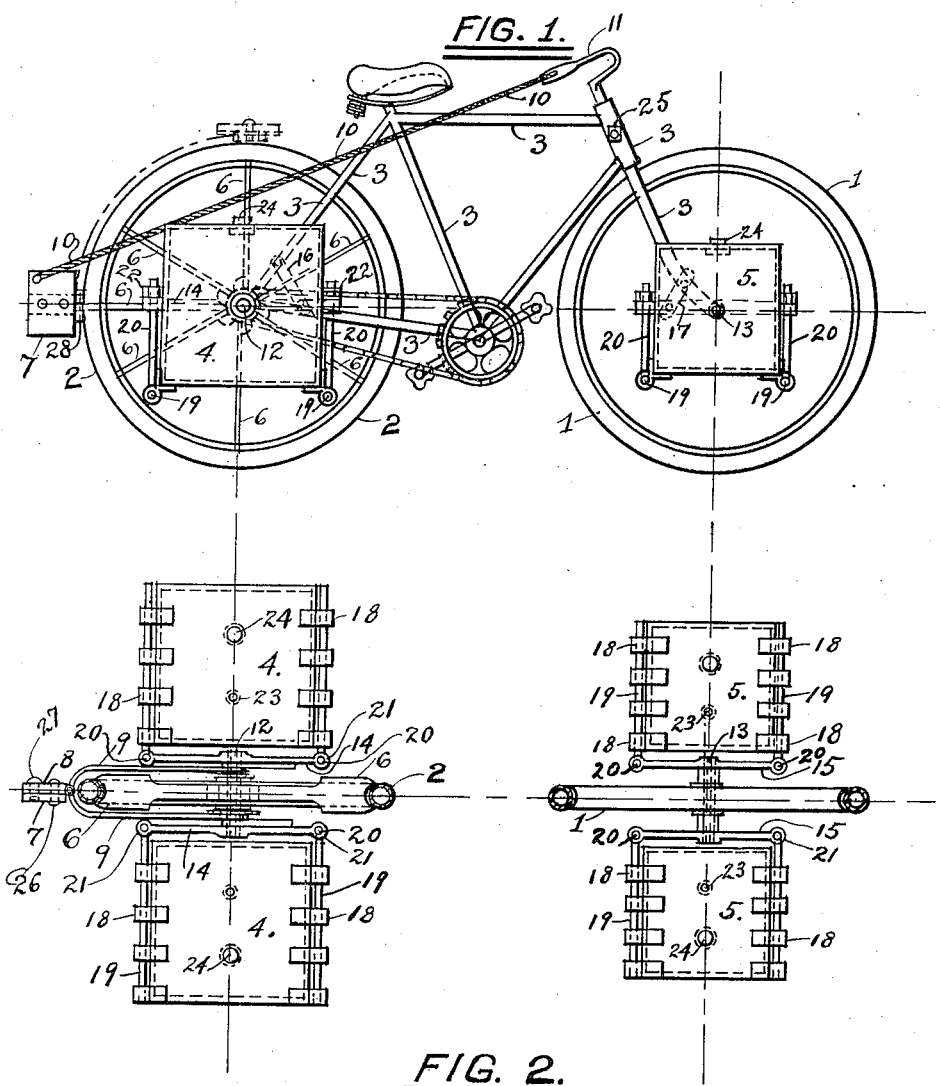
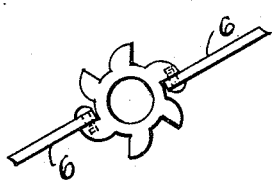

UNITED STATES PATENT OFFICE.

MORRIS L. OSOFS AND MORRIS R. SLUTZKY, OF NEW YORK, N. Y.

HYDROCYCLE.

1,060,620. Specification of Letters Patent. Patented May 6, 1913.

Application filed July 22, 1912. Serial No. 710,949.

*To all whom it may concern:*

Be it known that we, MORRIS L. OSOFS and MORRIS R. SLUTZKY, citizens of the United States, residing at 431 Stone avenue, in the borough of Brooklyn of the city of New York, in the county of Kings and State of New York, have invented a new and useful Hydrocycle, of which the following is a specification.
Our invention relates to improvements in hydrocycles, adapted to run on either land or water and in the novel features thereof hereinafter described, and the objects of our improvement are: First to design a hydrocycle which could readily ride across rivers, ponds and similar stretches of still water; second to have the same hydrocycle readily converted into a bicycle adapted to run on land without much trouble or difficulty;
third, to have the floating attachments of the hydrocycle light and easy to fold or pack up; and fourth, to have the entire device simple, durable and inexpensive. We attain these objects by the device illustrated in the accompanying drawings, in which—

Figure 1 is an elevation of the hydrocycle with the floats in position and the spokes of the wheels omitted for the sake of clearness. Fig. 2 is a sectional plan or top view of the wheels of the hydrocycle, shown with the floats attached, the frame of the hydrocycle being omitted. Fig. 3 is a detail on a larger scale showing a method of securing the inner ends of the vanes or paddles 6 of the hydrocycle.

Similar numerals refer to similar parts throughout the several views.

1 is the front wheel, 2 the rear wheel of the hydrocycle; 3 is the frame; 4, 4 are the floats supporting the rear wheel; 5, 5 are the floats supporting the front wheel; 6, 6 are the vanes or paddles shown as radially secured to the rear wheel; 7 is the rudder; 8 is the reinforcement or back of the rudder;
9 is the rudder frame, 10 is a steering line attached to the rudder at one end; 11 are the handle bars, to which the other end of the steering line is attached; 12 is the axle of the rear wheel; 13 is the axle of the front wheel;
14, 14 are side-bars attached to the axle of the rear wheel; 15, 15 are side bars attached to the axle of the front wheel; 16 are braces connecting side bars 14 to frame 3, and 17 are braces connecting side bars 15 to frame 3 of the hydrocycle; 18, 18 are straps forming sockets secured at the lower edges of the floats 4 and 5; 19, 19 are horizontal rods secured to the floats 4 and 5 by means of the said sockets 18, 18, and supporting the same, the said floats being preferably made of rubber or some other suitable material and inflated when used on water, being deflated and folded up when the hydrocycle is used on land; 20, 20 are vertical extensions of said rods 19, which extensions could be secured to the ends 21 of the side bars 14 and 15 in any suitable manner, but which are shown as secured by means of nuts 22. The extensions 20 of the rods 19 could be conveniently connected to said rods 19 by means of suitable hinges not shown in the drawings; 23 and 24 are valves for inflating and deflating the floats 4 and 5; 25 is a set screw for fixing the front wheel 1 with relation to the frame 3 when the hydrocycle is in the water; 26 is a pin and 27 is a set screw, both connecting the rudder 7 to its back 8, which set screw 27 on being removed, allows the rudder to be revolved in relation to its back 8 on the pin 26 as a pivot; 28 is the rudder pin; the rudder frame 9 is also pivotally placed with relation to the axle of the wheel 2, and it could be revolved into a vertical position bringing the rudder 7 to the top of the wheel 2, which rudder could then be turned on the rudder pin 28 into the position shown in dotted lines in Fig. 1; consequent rotating of the rudder 7 in a horizontal plane on the pin 26 as a pivot through an angle of 180° will bring it to a position symmetrical to the frame of the hydrocycle. The radial vanes or paddles, 6, 6 are connected also at their outer ends to the inner rim of the wheel 2, which connection is not shown on the drawings.

To operate the hydrocycle on water one has to inflate the floats 4 and 5 and to attach the same by means of the rods 19 and their vertical extensions 20 to the ends 21 of the side bars 14 and 15, place the rudder 7 in position and ride on, turning the rear wheel in the usual manner by means of the cranks shown in the drawings; the paddles 6 will propel the hydrocycle forward; the rudder 7, operated by the steering line 10, will turn the hydrocycle sidewise, while the wheel 1 will be fixed in position by means of the set screw 25. Having crossed the water one can readily detach the floats, deflate them and pack them up, put the rudder up behind the saddle and continue the ride on land. The floats 4 and 5 are shown as cubical; but they could also be made of any other suitable shape; the vanes 6 could also be varied in shape and position without departing from the main principle of our invention. Many other modifications could be made in our hydrocycle within the scope of our invention.

What we claim as new and desire to protect by Letters Patent is:

1. In a hydrocycle a bicycle, propelling vanes secured to the rear wheel thereof, a rudder adapted to steer it, a pair of inflated floats of nearly cubical shape supporting each wheel of said bicycle, combined with side bars secured to the axles of said bicycle, horizontal rods detachably connecting said floats to said side bars, and straps secured to the edges of said floats and adapted to form sockets for said rods.

2. In a hydrocycle a bicycle, propelling vanes secured to the rear wheel thereof, a rudder adapted to steer it, a pair of inflated floats supporting each wheel of said bicycle, combined with side bars secured to the axle of each wheel of said bicycle, vertical posts connected to said side bars and horizontal rods detachably connecting said floats to said vertical posts.

3. In a hydrocycle a bicycle, propelling vanes secured to the rear wheel thereof, a rudder adapted to steer it, and a forked frame connecting said rudder to the axle of the rear wheel of said bicycle, combined with a pair of inflated floats detachably connected to the axle of each wheel of said bicycle.

4. In a hydrocycle a bicycle, propelling vanes secured to the rear wheel thereof, a rudder adapted to steer it, a forked rudder frame pivotally connected to the axle of the rear wheel of said bicycle, combined with a pair of inflated floats detachably connected to the axle of each wheel of the said bicycle.

5. In a hydrocycle a bicycle, inflated floats detachably connected thereto, propelling vanes secured to the rear wheel of the said bicycle, a rudder adapted to steer the same, a rudder frame pivotally connected to said bicycle and adapted for rotating said rudder in its own plane.

MORRIS L. OSOFS.
MORRIS R. SLUTZKY.

Witnesses:
PHILIP ORDOVER,
JOSEPH BANNER.

---

Copies of this patent may be obtained for five cents each, by addressing the "Commissioner of Patents, Washington, D. C."